(12) United States Patent
In et al.

(10) Patent No.: US 11,808,940 B2
(45) Date of Patent: Nov. 7, 2023

(54) EYE TRACKING SYSTEM FOR SMART GLASSES AND METHOD THEREFOR

(71) Applicant: MediThinQ Co., Ltd., Seongnam-si (KR)

(72) Inventors: Sungil In, Suwon-si (KR); Seungjoon Im, Seoul (KR)

(73) Assignee: MEDITHINQ CO., LTD., Seongnam-si (KR)

( * ) Notice: Subject to any disclaimer, the term of this patent is extended or adjusted under 35 U.S.C. 154(b) by 0 days.

(21) Appl. No.: 17/767,733

(22) PCT Filed: Oct. 12, 2020

(86) PCT No.: PCT/KR2020/013858
§ 371 (c)(1),
(2) Date: Apr. 8, 2022

(87) PCT Pub. No.: WO2021/071335
PCT Pub. Date: Apr. 15, 2021

(65) Prior Publication Data
US 2022/0413285 A1    Dec. 29, 2022

(30) Foreign Application Priority Data
Oct. 10, 2019    (KR) .......................... 10-2019-0125447

(51) Int. Cl.
*A61B 3/10*    (2006.01)
*A61B 3/12*    (2006.01)
(Continued)

(52) U.S. Cl.
CPC .......... *G02B 27/0093* (2013.01); *G06F 3/013* (2013.01); *G06V 40/18* (2022.01); *G02B 2027/0178* (2013.01)

(58) Field of Classification Search
CPC .......... A61B 3/02; A61B 3/102; A61B 3/1025; A61B 3/113; A61B 3/1015; A61B 3/103;
(Continued)

(56) References Cited

U.S. PATENT DOCUMENTS 10,152,495 B2 * 12/2018 Rahman ................ G06F 16/951
2012/0327116 A1   12/2012 Liu et al.
(Continued)

FOREIGN PATENT DOCUMENTS

CN    103635849 A    3/2014
CN    108700952 A    10/2018
(Continued)

*Primary Examiner* — Dawayne Pinkney
(74) *Attorney, Agent, or Firm* — Birch, Stewart, Kolasch & Birch, LLP

(57) ABSTRACT

The present invention provides an eye tracking system including: a pupil sensing unit sensing a pupil of a user by at least one sensor embedded in smart glasses; a display unit including smart lenses to which a plurality of target objects is floated; an eye tracking unit tracking an eye through at least one sensor and acquiring eye state information of the user for the plurality of target objects; and an input unit performing an input after selecting a specific object in which the eye of the user stays for a predetermined time or more among the plurality of target objects as an input object based on the eye state information, in which at least one of a size, a color, and a movement direction of the input object is changed based on the eye state information of the user.

6 Claims, 11 Drawing Sheets

(51) Int. Cl.
*A61B 3/02* (2006.01)
*G02C 7/02* (2006.01)
*G02B 27/00* (2006.01)
*G02B 27/01* (2006.01)
*G06V 40/18* (2022.01)
*G06F 3/01* (2006.01)

(58) Field of Classification Search
CPC ...... A61B 3/1225; A61B 3/024; G02C 7/024; G06F 3/011; A61F 9/026; G02B 27/02; G02B 21/22; G02B 23/00; G02B 27/01; G02B 27/12; G02B 27/0093; G02B 2027/014
USPC ....... 351/210, 200, 205, 206, 209, 221–223, 351/246, 41, 159.75, 159.76; 345/7, 9, 345/156; 359/462, 466, 404, 630–636, 359/639; 349/11
See application file for complete search history.

(56) References Cited

U.S. PATENT DOCUMENTS

| | | | |
|---|---|---|---|
| 2014/0267400 A1* | 9/2014 | Mabbutt | G06F 3/017 345/633 |
| 2017/0068316 A1 | 3/2017 | Seok | |
| 2017/0249017 A1 | 8/2017 | Ryu et al. | |
| 2017/0340200 A1* | 11/2017 | Blaha | A61B 3/113 |
| 2018/0074583 A1 | 3/2018 | Suk | |
| 2019/0377425 A1 | 12/2019 | Ryu et al. | |

FOREIGN PATENT DOCUMENTS

| | | | |
|---|---|---|---|
| JP | 2013196158 A | * | 9/2013 |
| KR | 10-2014-0034252 A | | 3/2014 |
| KR | 10-2016-0110315 A | | 9/2016 |
| KR | 10-1671838 B1 | | 11/2016 |
| KR | 10-2017-0101730 A | | 9/2017 |
| KR | 10-2019-0066316 A | | 6/2019 |
| KR | 10-2128894 B1 | | 7/2020 |

* cited by examiner

[FIG. 1a]
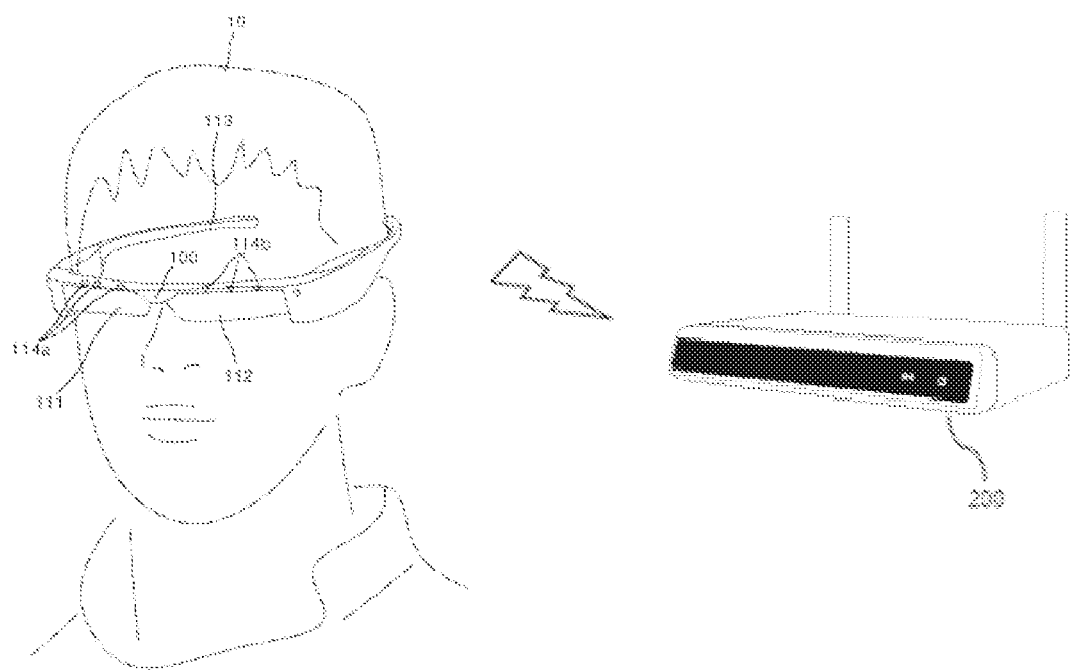
[FIG. 1b]
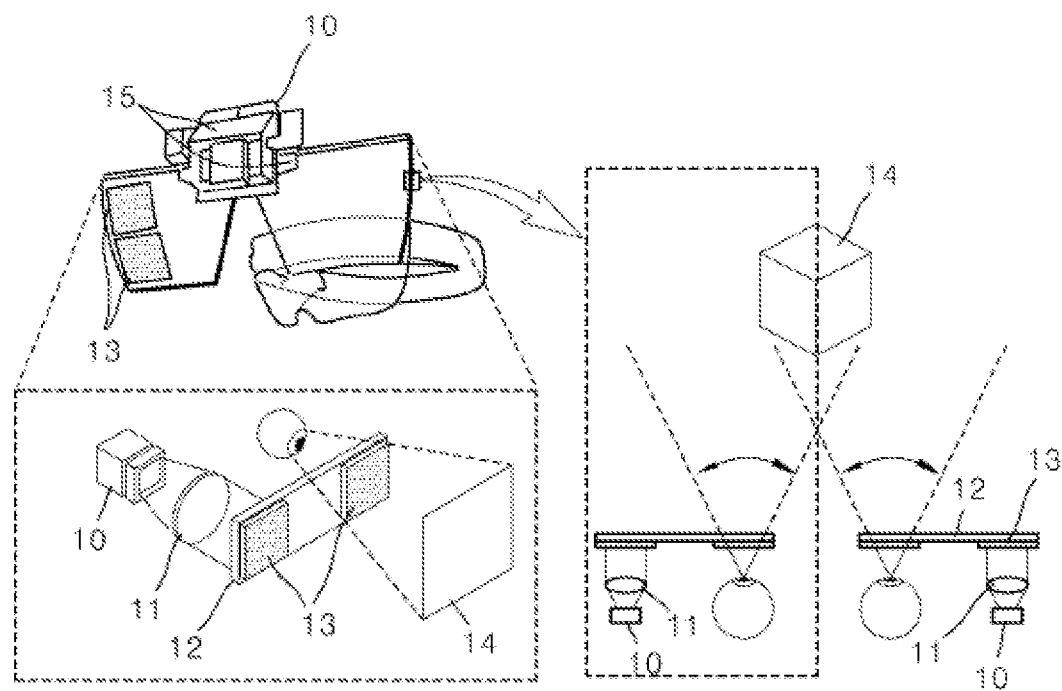

[FIG. 2]
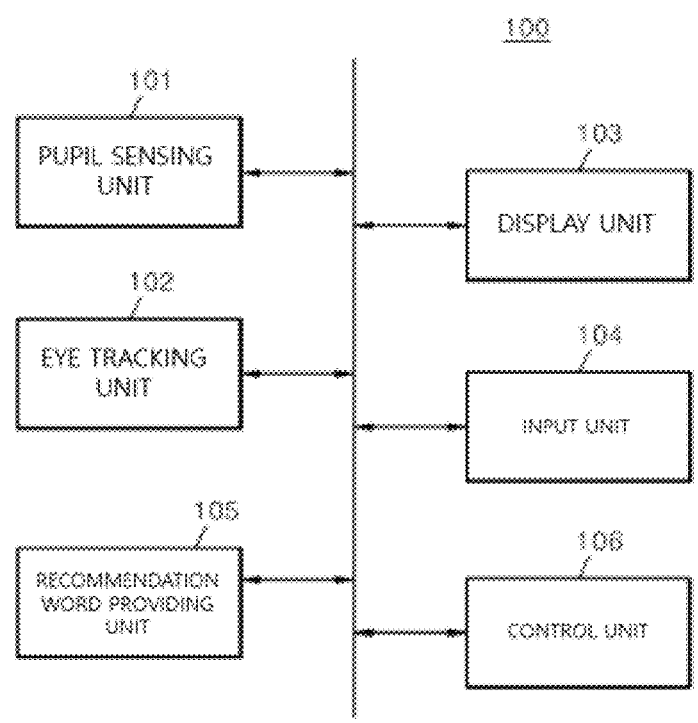

[FIG. 3]
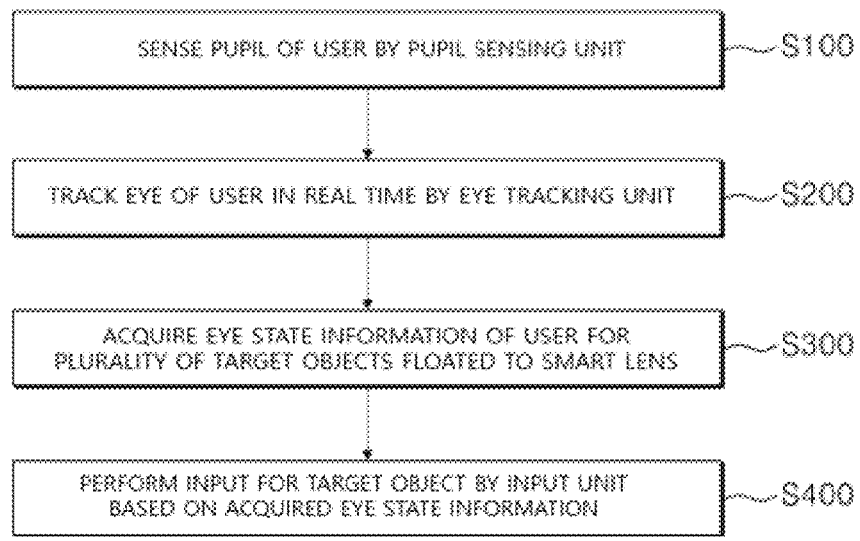

[FIG. 4]
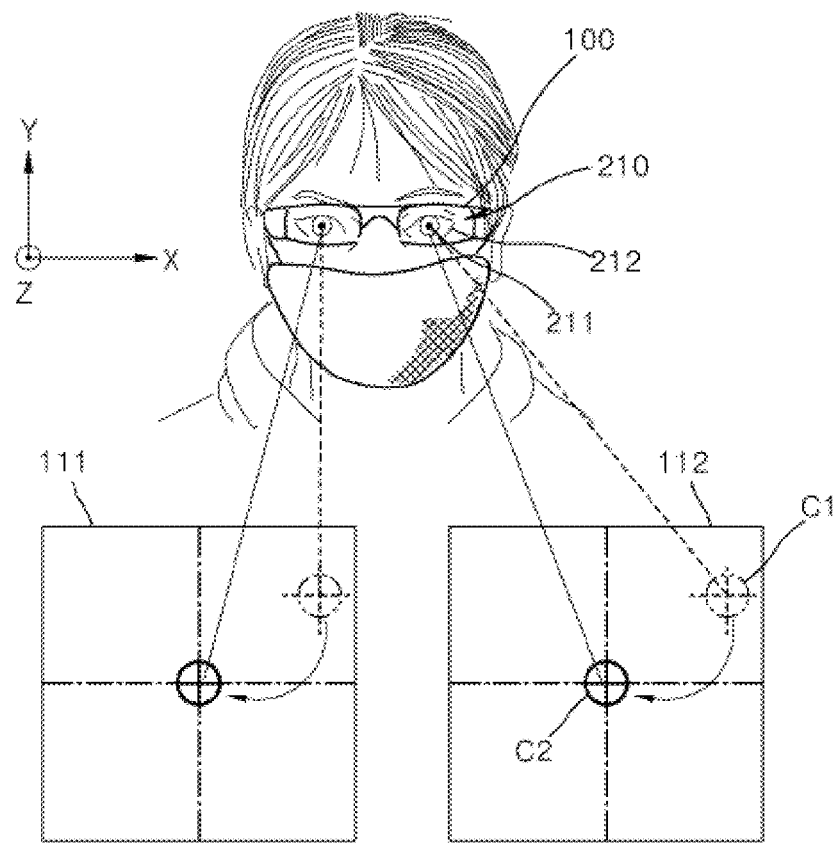

[FIG. 5a]
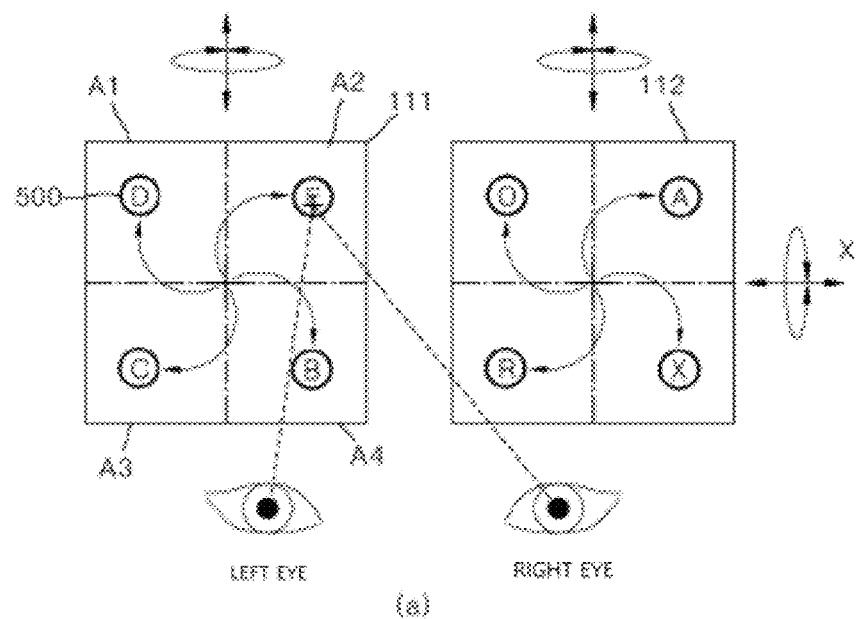
(a)
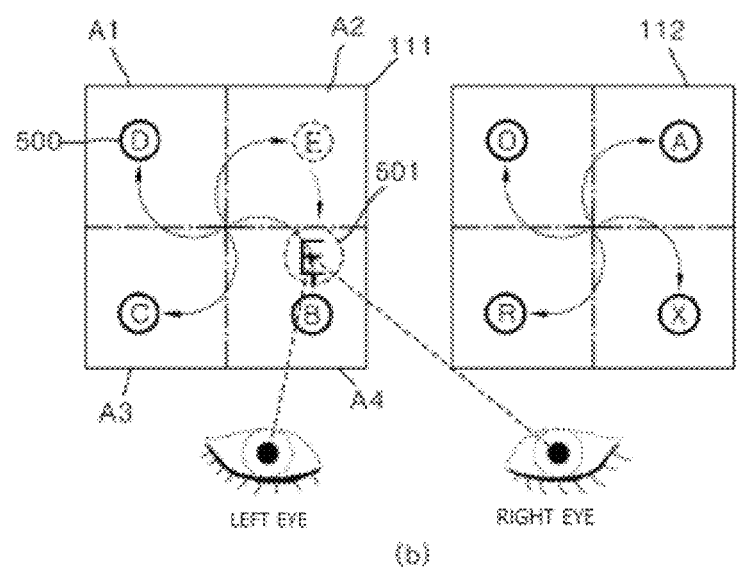
(b)

[FIG. 5b]
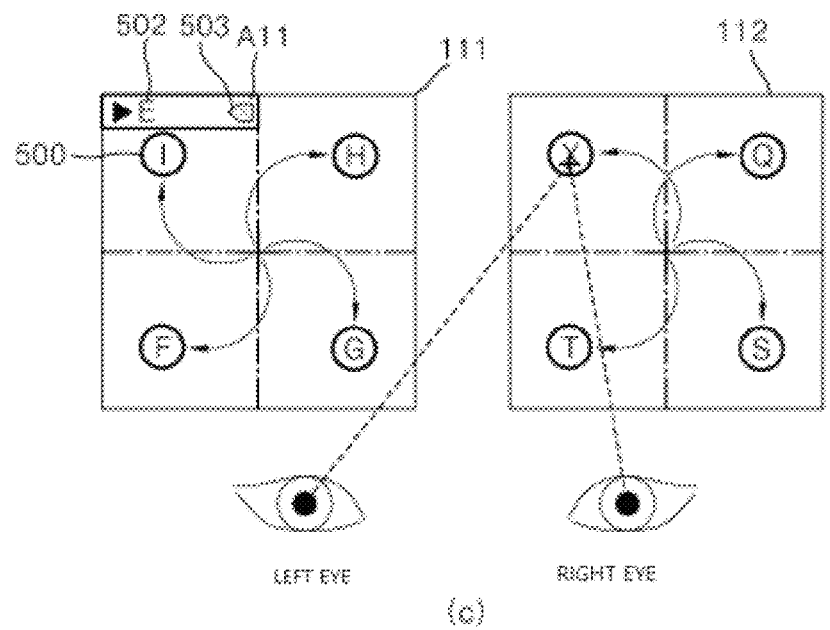
(c)
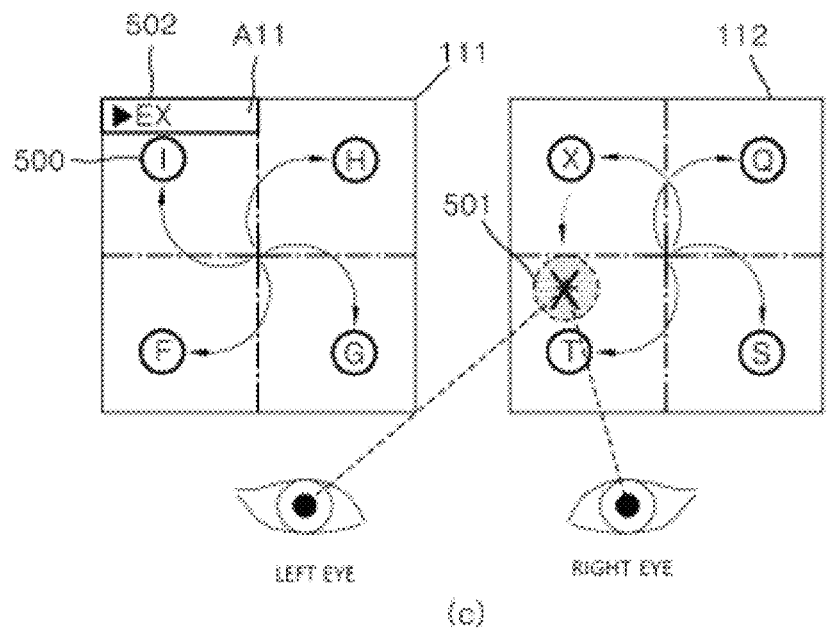
(c)

[FIG. 6]
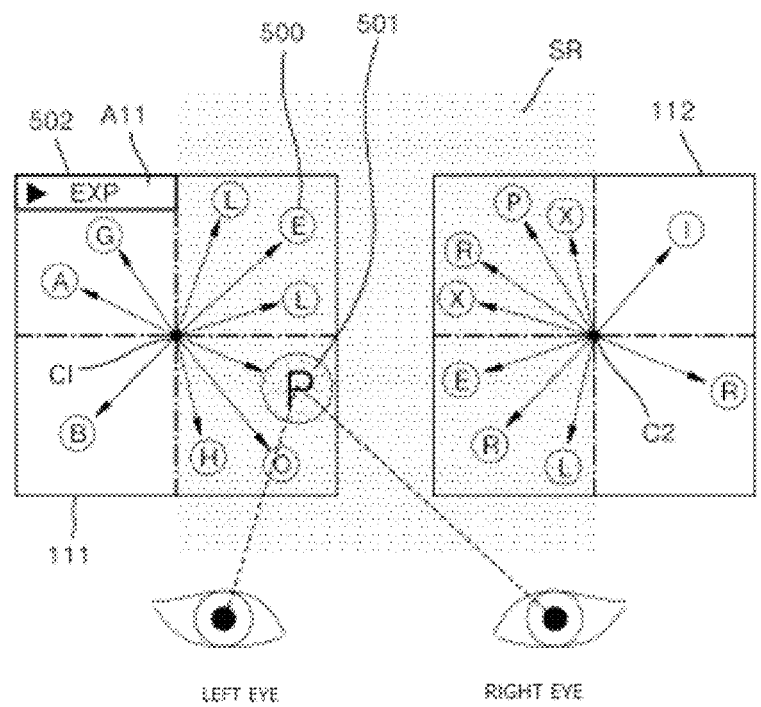

[FIG. 7]
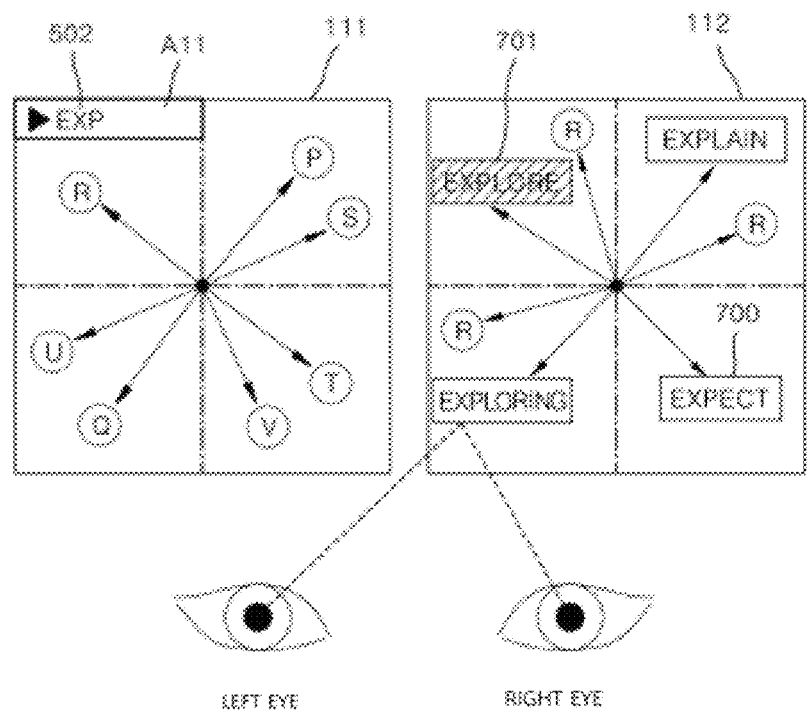

[FIG. 8]
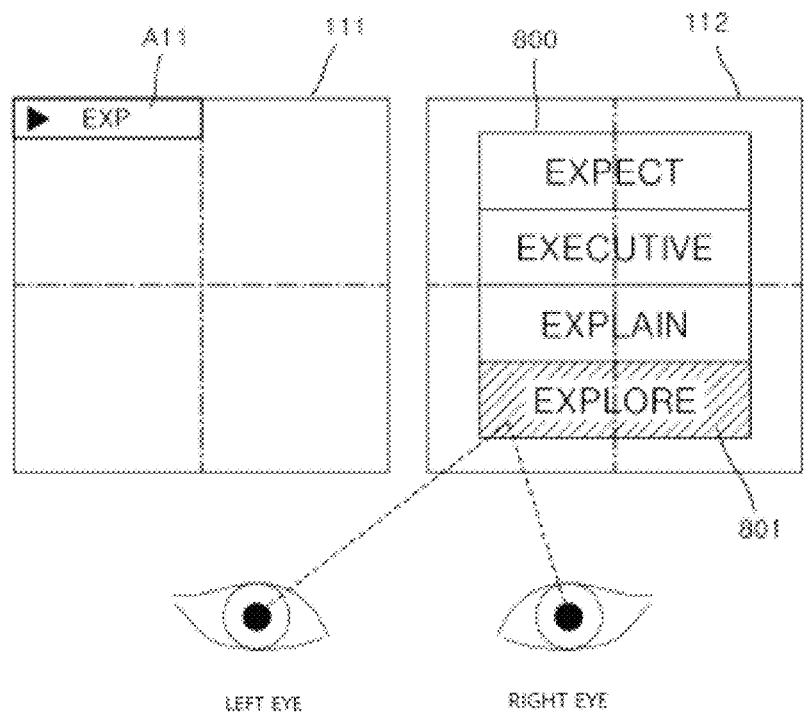

[FIG. 9]
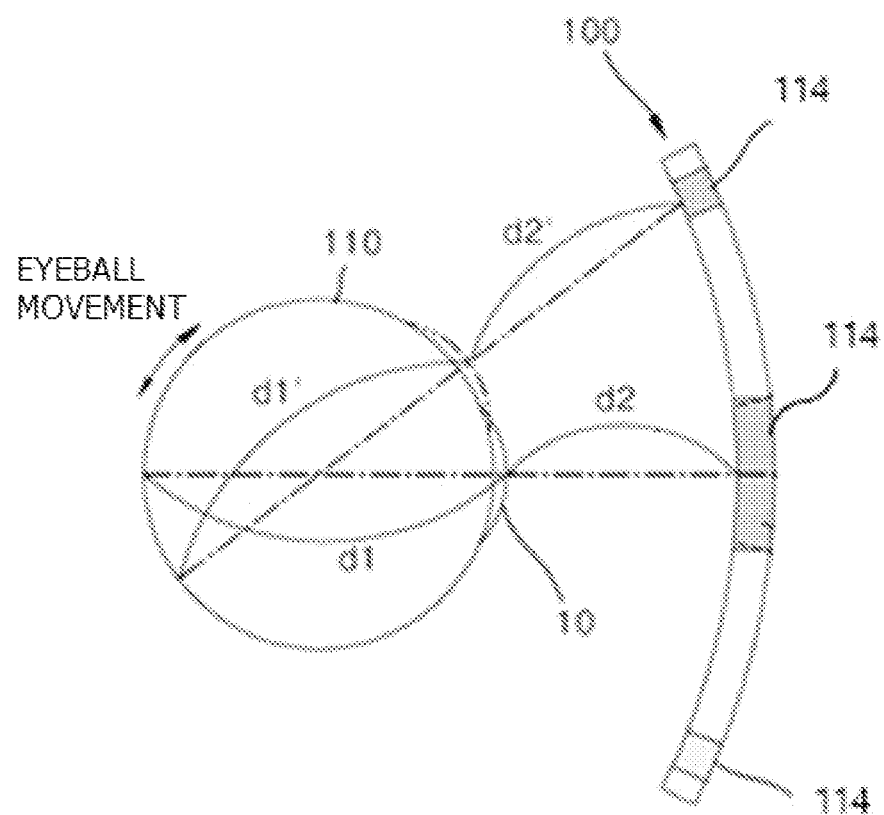

[FIG. 10]
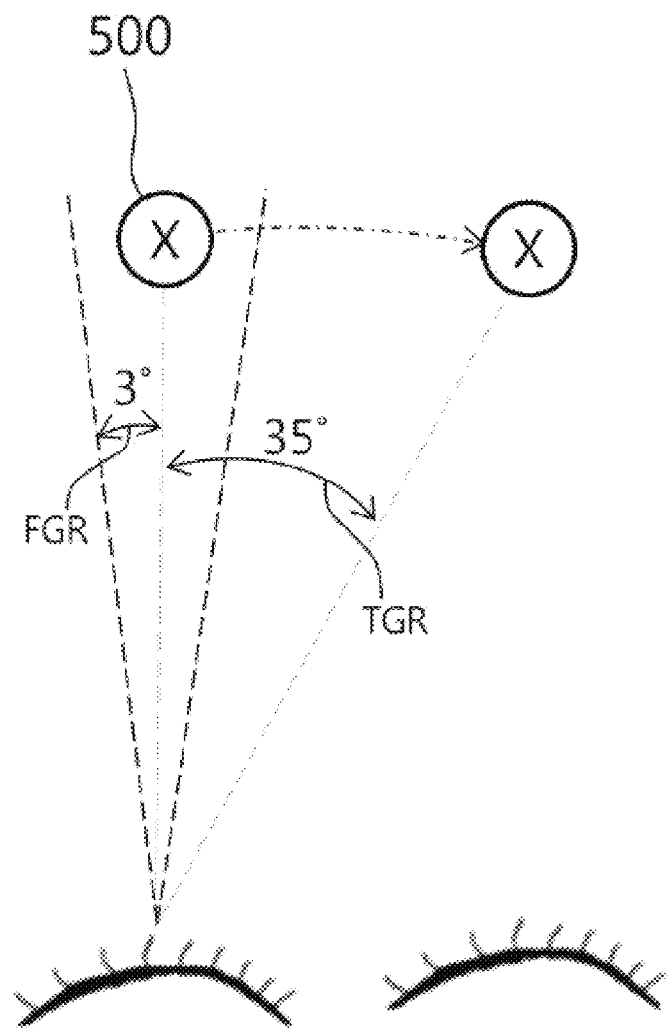

EYE TRACKING SYSTEM FOR SMART GLASSES AND METHOD THEREFOR

CROSS REFERENCE TO RELATED APPLICATIONS

This application is the National Phase of PCT International Application No. PCT/KR2020/013858, filed on Oct. 12, 2020, which claims priority under 35 U.S.C. 119(a) to Patent Application No. 10-2019-0125447, filed in Republic of Korea on Oct. 10, 2019, all of which are hereby expressly incorporated by reference into the present application.

TECHNICAL FIELD

The present invention relates to an eye tracking system, and more particularly, to an eye tracking system having improved target detection accuracy and enhanced work convenience by using smart glasses.

BACKGROUND ART

In recent years, as an application field of virtual reality ("VR"), augmented reality ("AR"), or mixed reality ("MR"), a medical service and a health care have been spotlighted. VR, AR, and MR technologies using smart glasses emerge as alternatives of promotion of medical experts and psychological treatment for coping with an increase in medical service demand such as an arrival of an aging era and psychological disease caused due to competition intensifying. In particular, the VR which deviates from a case where the VR is limitatively used for trauma treatment in related art and an application range of the VR is extended to all medical areas such as surgery, treatment, rehabilitation, etc. When the VR is used, training education is possible by implementing a virtual patient or organ, and a medical team may make an appropriate plan and perform a test in advance before surgery.

However, in the VR, AR, and MR technologies, in general, an input is very inconvenient. Partial voice recognition may also be used, but input means of the VR, AR, and MR technologies is very limitative compared with an input of an existing computer or a cellular phone, which is input by using visual information. There is often a case where the medical team should search required information such as a chart or an X-ray photo file of the patient for referring to a state of the patient, input or process a simple character input situation, or control a device, upon treatment such as robot surgery, remote surgery, etc., and there are many cases where it is significantly inconvenient only by a user interface provided in the existing VR, AR, and MR.

Accordingly, when the VR, AR, and the MR devices are used in the medical device, a user interface is urgently required, which enables the medical team to control a character input or a device by a simple method without inconvenience.

Meanwhile, a technology which becomes a background of the present invention is prepared in order to facilitate understanding of the present invention. It should not be appreciated that matters disclosed in the technology which becomes the background of the present invention are present as prior art.

DISCLOSURE

Technical Problem

An object to be solved by the present invention is to provide an eye tracking system of smart glasses, which is capable of increasing convenience of work of a user by changing a size, a shape, and a movement direction of an object input according to an eye of the user.

Further, an object to be solved by the present invention is to provide an eye tacking system of smart glasses, which is capable of enhancing accuracy of an input of the user and accuracy of staring by setting an eye range of the user in a smart lens. Further, an object to be solved by the present invention is to provide an eye tacking system of smart glasses, which is capable of effectively shortening a work speed of the user by providing an automatic recommendation word based on input objects.

The objects of the present invention are not limited to the aforementioned objects, and other objects, which are not mentioned above, will be apparent to a person having ordinary skill in the art from the following description.

Technical Solution

In order to solve the above-described problem, an eye tracking system of smart glasses according to an embodiment of the present invention may include: a pupil sensing unit sensing a pupil of a user by at least one sensor embedded in smart glasses; a display unit including smart lenses to which a plurality of target objects is floated; an eye tracking unit tracking an eye through at least one sensor and acquiring eye state information of the user for the plurality of target objects; and an input unit performing an input after selecting a specific object in which the eye of the user stays for a predetermined time or more among the plurality of target objects as an input object based on the eye state information, in which at least one of a size, a color, and a movement direction of the input object may be changed based on the eye state information of the user.

Further, the eye state information may include a motion of a pupil of the user and whether an eye of the user being opened or closed, and the input object may be determined based on the eye state information of the user.

Further, the target object may include any one of a consonant, a vowel, a word, and an image.

Further, the smart lenses may be divided into four quadrants based on a center point, and at least one target object may be floated to each area of four quadrants.

Further, the plurality of target objects floated to each area of four quadrants may be floated at once at one cycle or sequentially floated through various cycles.

Further, the target objects may be floated in different directions based on the center point of the smart lens and the directions may include at least one of a diagonal direction, a clockwise direction, a counterclockwise direction, and a whirl direction.

Further, the target objects may be floated in line from one side to the other side of the smart lens.

Further, the target object may include an automatic recommendation word, and the automatic recommendation word may be floated one by one the smart lens or pops up or displayed in a list form.

Further, the automatic recommendation word may be floated with a differential speed based on an interest level of the user, and the interest level may be determined by any one of an interested item preset by the user, a business field of the user, and an input frequency of the user for the target object.

Further, the eye tracking system may further include an eye range setting unit that sets an eye range of the user based on eye tracking data tracked from the eye tracking unit, and the eye range setting unit may include at least two areas frequently exposed to the eye of the user among four quadrants.

Further, the display unit may float more target objects to the eye range area than an area other than the eye range area.

Meanwhile, an eye tracking method according to an embodiment of the present invention may include: sensing, by a pupil sensing unit, a pupil of a user; tracking, by an eye tracking unit, an eye of the user for a plurality of target objects floated to a display unit; acquiring eye state information of the user for the plurality of target objects; and selecting, by an input unit, a specific object in which the eye of the user stays for a predetermined time or more among the plurality of target objects as an input, and then inputting the selected specific object, and at least one of a size, a color, and a movement direction of the input object may be changed based on the eye state information of the user.

Further, the input object may be floated in at least one direction of a diagonal direction, a clockwise direction, a counterclockwise direction, and a whirl direction based on a center point of the display unit.

Further, when the eye of the user stays at the target object for at least 2 seconds, the target object may be selected as the input object, and information corresponding to an input object selected when the eye of the user is blinked at least two times or the selected input object or there is a specific motion of a specific single muscle or muscle group may be input.

Further, the case where the eye of the user stays in the target object for at least 2 seconds may include a case where the eye stays around the target object, but tracks the target object for 2 seconds or more based on a movement path of the target object or a case where the eye stays around the target object, but a tracking deviation angle for the target object is 35° or more.

Here, the target object surrounding means a point where a floating deviation angle (FGR) may be 3° or less.

Further, the case where the input is determined for the input object may further include a case where the eye stays around the target object, but tracks the target objects for 1 second or more based on the movement path of the target object, and the eye is moved in advance up to a path in which a deviation angle is 45° or more on a motion expectation path of the target object.

Meanwhile, a computer readable recording medium storing instructions may allow a pupil sensing unit to sense a pupil of a user; an eye tracking unit to track an eye of the user for a plurality of target objects floated to a display unit; acquire eye state information of the user for the plurality of target objects; and an input unit to determine a specific object in which the eye of the user stays for a predetermined time or more among the plurality of target objects by the user as an input object, and processing the determined object as an input, but change at least one of a size, a color, and a movement direction of the input object based on eye state information of the user.

Meanwhile, the effects according to the present invention are not limited by the contents exemplified above, and other various effects are included in the present specification.

Advantageous Effects

According to the present invention, a size, a shape, and a movement direction of an input object are changed according to an eye of a user to remarkably increase convenience of input work of the user in VR, AR, and MR.

Further, according to the present invention, an eye range of the user is set in a smart lens to enhance accuracy of the input and accuracy of staring of the user.

Further, according to the present invention, an automatic recommendation word is provided based on input objects to effectively shorten a work speed of the user.

The effects according to the present invention are not limited by the contents exemplified above, and other various effects are included in the present specification.

DESCRIPTION OF DRAWINGS

FIG. 1a is a schematic diagram of an eye tracking system according to an embodiment of the present invention.

FIG. 1b is a diagram for describing a display scheme of smart glasses according to an embodiment of the present invention.

FIG. 2 is a configuration diagram of smart glasses according to an embodiment of the present invention.

FIG. 3 is a flowchart for describing a target object input method depending on eye tracking according to an embodiment of the present invention.

FIG. 4 is an exemplary diagram for describing a pupil sensing process according to an embodiment of the present invention.

FIGS. 5a and 5b are exemplary diagrams for describing an input process of a target object using an eye according to an embodiment of the present invention.

FIG. 6 is an exemplary diagram for describing an input process of a target object using an eye according to an embodiment of the present invention.

FIG. 7 is an exemplary diagram for describing an input process of an automatic completion object using an eye according to another embodiment of the present invention.

FIG. 8 is an exemplary diagram illustrating an automatic completion list according to yet another embodiment of the present invention.

FIG. 9 is an exemplary diagram for describing an eye sensor according to an embodiment of the present invention.

FIG. 10 is an exemplary diagram for describing a process of judging an input object and determining the input object as an input according to an embodiment of the present invention.

BEST MODE

In order to achieve the object, the present invention provides a brain stimulation device including: an electrode unit constituted by one or more electrodes and configured to move back and forth to a head of a user to fix the electrode onto the head of the user; an auxiliary pressing unit configured to move back and forth to the head of the user to fix the electrode unit onto the head of the user; and a donut type support unit having a donut type inner side on which the electrode unit and the auxiliary pressing unit are disposed and which surrounds the head of the user.

MODE FOR INVENTION

Advantages of the present invention, and methods for accomplishing the same will be more clearly understood from embodiments described in detail below with reference to the accompanying drawings. However, the present invention is not limited to the following embodiments but may be implemented in various different forms. The embodiments are provided only to make description of the present invention complete and to fully provide the scope of the present invention to a person having ordinary skill in the art to which the present invention pertains, and the present invention will be just defined by the appended claims.

The shapes, sizes, ratios, angles, numbers, and the like illustrated in the drawings for describing the embodiments of the present invention are merely examples, and the present invention is not limited thereto. Further, in describing the present invention, a detailed explanation of known related technologies may be omitted to avoid unnecessarily obscuring the subject matter of the present invention. The terms such as "including," "having," and "consisting of" used herein are intended to allow other components to be added unless the terms are used with the term "only". Any references in a case where a component is expressed as a singular, the case includes plural unless expressly stated otherwise.

Components are interpreted to include an error range even if not expressly stated.

The features of various embodiments of the present invention can be partially or entirely bonded to or combined with each other and can be interlocked and operated in technically various ways to be sufficiently appreciated by those skilled in the art, and the embodiments can be carried out independently of or in association with each other.

Hereinafter, a configuration of smart glasses according to an embodiment of the present invention will be described with reference to FIGS. 1a to 2.

FIGS. 1a and 1b are schematic diagrams of an eye tracking system according to an embodiment of the present invention. FIG. 2 is a configuration diagram of smart glasses according to an embodiment of the present invention.

Referring to FIG. 1a, the eye tracking system may include smart glasses 100 and an eye tracking server 200. The smart glasses 100 and the eye tracking server 200 may be connected by wireless communication, e.g., short-range wireless communication such as Bluetooth, WiFi, etc. However, in the embodiment of FIG. 1a, a form in which the smart glasses 100 and the eye tracking server 200 are separated is illustrated, but the smart glasses 100 and the eye tracking server 200 may also be mounted on one housing. When the smart glasses 100 and the eye tracking server 200 are mounted on one housing, the smart glasses 100 and the eye tracking server 200 may be connected wiredly. The smart glasses 100 is a device which may sense and track an eye by using at least one sensor embedded therein, and further, select a target object floated on a screen of a display unit 103 and input information related to the corresponding target object.

As illustrated in FIG. 1a, the smart glasses 100 may be constituted by smart lenses 111 and 112, glasses supports 113, a pupil sensing unit 101, and an eye tracking unit 102.

In the present invention, the smart glasses 100 enables a user to view a screen by a scheme in which a screen projected from a micro display unit 10 of a display panel (a first lens and a second lens) is reflected and viewed by eyes through the first and second lenses as illustrated in FIG. 1b, for example. However, in the present specification, a display having the above-described structure is primarily described, but is not limited thereto. A form is also possible in which while an HMD display is used, an external screen is photographed by using a camera of the smart glasses 100 through a see-through mode, and then the external screen is combined with an information screen and shown through a screen of the VR. Alternatively, the camera may also display the target object on the screen photographed in link with the smart glasses 100 while photographing a diseased part or a surgical portion of a patient.

Further, as illustrated in FIG. 1b, the smart glasses 100 may also display an image 14 by using a microdisplay 10 and a prism disposed in one area (e.g., an upper end of a center) of the smart glasses 100. Specifically, when the microdisplay 10 irradiates the image through the lens 11 disposed on a front thereof, the irradiated image reaches one area of a display panel 12 of the smart glasses 100 through the lens 11, and then the image may be totally reflected by a splitter 13 attached on one surface of the display panel 12. In other words, the microdisplay 10 disposed at a middle of both lenses irradiates the image to a left lens and a right lens, and then display a stereoscopic shape virtual image (or the image 14) to front surface portions of a left eye and a right eye by using total reflection characteristics of the splitter.

The display unit 103 as a component which displays a plurality of target objects may include a first lens 111 and a second lens 112 disposed at a locations corresponding to the right eye and the left eye of the user on the front surface portion of the smart glasses 100. In the present specification, the first lens 111 and the second lens 112 are collectively referred to as a 'smart lens' for convenience of description. Meanwhile, the smart lenses 111 and 112 should be interpreted as a concept including all of the microdisplay in the screen of the VR and Google glasses, and a display irradiating light to the eye by using the prism.

Here, the target object as information which the user intends to input through the eye may include a plurality of objects having a form of a character or an image. For example, the target object may be each letter, a word form, an icon form, or an image itself.

In this case, at least one of a size, a color, a form, and a movement direction of the target object is changed according to eye state information of the user and floated to the display unit 103. Various changes of the target object depending on the eye will be described below.

Further, in respect to the target object, a consonant may be floated in one lens and a vowel may be floated in the other lens according to the embodiment.

Further, in the present invention, the eye state information may mean a motion of a pupil 211 of the user and whether the eye of the user is opened or closed.

Referring to FIG. 1a, the pupil sensing unit 101 is a component which sensing a pupil 211 of the user, and a plurality of pupil sensing units 101 may be disposed along a periphery of a glass frame to which the front surface portion of the smart glasses 100, i.e., the first lens 111 is fixed. In this case, the pupil sensing unit 101 is constituted by at least one sensor unit 114. The sensor unit 114 may include a left-eye sensor unit 114a and a right-eye sensor unit 114b. Referring to FIG. 9, the sensor unit 114 may irradiate infrared rays which do not cause an impaired vision to the pupil, and then specify a distance (d1+d2) reflected on a fundus of an eyeball through the pupil, for example. In this case, the reflected distance may be subdivided into a distance d1 from the fundus up to the pupil and a distance d2 from an eyeball surface up to the sensor unit 114. In this case, a location and an eye direction of the pupil may be specified by using the respective distances d1 and d2 acquired through a plurality of sensors. Through minute eye sensing illustrated in FIG. 9, the smart glasses may acquire a detailed location of the pupil and the eye.

An eye tracking unit 102 as a component which senses eye state information of the user for a plurality of target objects floated on the screen of the smart lens may track the eye of a user who wears the smart glasses 100 in real time. As illustrated in FIGS. 1a and 1b, the eye tracking unit 102 may be disposed in line along the periphery of the glass frame to which the second lens 112 is fixed. In this case, the eye tracking unit 102 includes at least one sensor unit 114b.

Locations of the pupil sensing unit 101 and the eye tracking unit 102 are not limited thereto, and may be disposed to be embedded in at least one area of a glass support 113 or the glass frame of the smart glasses 100. For example, the pupil sensing unit 101 and the eye tracking unit 102 may be disposed on a side portion of the smart glasses 100 or also directly disposed in the display unit 103 of the smart glasses 100. Specific operations of the pupil sensing unit 101 and the eye tracking unit 102 will be described below.

An input unit 104 is a component which performs an input for the target object based on the eye state information. Specifically, the eye state information of the user is acquired in real time by using the eye tracking unit 102, and as a result, the input unit 104 selects a specific object which the eye of the user stays for a predetermined time among the plurality of target objects as an input object, and performs an input for the corresponding object when there is a gesture of an additional eye or a single muscle around the eye or a muscle group (for example, when the eye is closed for a predetermined time or more or the eye is blinked at a predetermined number of times for a reference time).

A recommendation word providing unit 105 is a component which provides an automatic recommendation word started with a corresponding letter in a floating form or a pop-up list form when at least two target objects are input. Detailed contents related thereto will be described later.

The control unit 106 may perform a function of controlling all operations for the pupil sensing unit 101, the display unit 103, the eye tracking unit 102, the input unit 104, and the recommendation word providing unit 105.

Hereinafter, an eye input method for the target object according to an embodiment of the present invention will be described in detail with reference to FIGS. 3 to 6.

FIG. 3 is a flowchart for describing a target object input method depending on eye tracking according to an embodiment of the present invention. FIG. 4 is an exemplary diagram for describing a pupil sensing process according to an embodiment of the present invention. FIGS. 5a and 5b are exemplary diagrams for describing an input process of a target object using an eye according to an embodiment of the present invention. FIG. 6 is an exemplary diagram for describing an input process of a target object using an eye according to an embodiment of the present invention.

First, the pupil sensing unit 101 senses the pupil of the user (S100).

Referring to FIG. 4, the user performs an operation of searching a center point of a gradation displayed through the first lens 111 and the second lens 112 of the smart glasses 100 while wearing the smart glasses 100. Prior to tracking the eye by the eye tracking unit 102, a process of sensing focusing of the pupil by the pupil sensor unit so as to measure a movement of a basic eye is required.

Specifically, the pupil sensing unit 101 senses whether the user pupil for a center point C2 of the smart lenses 111 and 112 of the user is focused, and then prepares for performing a following step when the pupil of the user is focused on the center point C2. However, when the pupil of the user views the other point C1 other than the center point C2, a guide message may be further provided so as for the user to search the center point C2 through a voice output using a speaker embedded in the smart glasses 100 or a phase output using the smart lenses 111 and 112.

Subsequently, the eye tracking unit 102 tracks the eye of the user in real time (S200). Subsequently, eye state information of the user for a plurality of target objects floated to the display unit 103 is acquired through real-time tracking of the eye tracking unit 102 (S300). Subsequently, the input for the target object is performed based on the acquired eye state information (S400).

First, in the present invention, it is based on a plurality of target objects 500 being floated to both the first lens 111 and the second lens 112 so as to provide a lot of objects to the user within a limited time. However, a scheme in which the plurality of target objects 500 is floated is not limited thereto. For example, the plurality of target objects 500 may also be floated while moving toward the other direction from one direction of the first lens 111 or the second lens 112.

Further, the plurality of target objects 500 may be floated through both lenses 111 and 112 at one cycle. As a result, the user may shorten a time consumed for inputting needs of the user. Alternatively, the plurality of target objects 500 may also be sequentially floated via multiple cycles (n cycles). As a result, the user may input the needs of the user more accurately.

Referring to FIG. 5a(a), an image viewed through the first lens 111 and the second lens 112 disposed to correspond to the left eye and the right eye of the user, respectively may be divided into four quadrants based on a specific location. For example, a screen viewed through the first lens 111 and the second lens 112 includes a first area A1 positioned at an upper left end, a second area A2 positioned at an upper right end, a third area A3 positioned at a lower left end, and a fourth area A4 positioned at a lower right end.

Referring to FIG. 5a(a), the plurality of target objects 500 floated to respective areas A1, A2, A3, and A4 may rotate in a whirl shape while being distant from the center point in a clockwise direction. However, a scheme in which the target object 500 is floated is not limited thereto, and may be modified to various schemes. For example, the target object 500 may also rotate in a counterclockwise direction as illustrated in FIG. 5b(c) according to the eye state information of the user or an importance of the target object 500, and may also be floated to be scattered in a diagonal direction at the center point. Alternatively, the target objects 500 may also be floated while being scattered at multi-angles.

Referring to FIG. 5a(a), the user may stare at an alphabet 'E' floated to the second area A2 for a predetermined time or more, and then the input unit 104 may select the corresponding alphabet 'E' as an input object 501. In this case, in order to distinguish from a case where the user views a target object which is not related to the input while just moving the eye, it is preferably meant that a predetermined time is at least 2 seconds. That is, the target object 500 at which the eye of the user stays for at least 2 seconds is judged as the input object 501. A specific description related thereto will be hereinafter made by jointly referring to FIG. 10.

However, the case where the eye of the user stays at the target object for at least 2 seconds (the step of judging the target object as the input object 501) may further include a case where the eye stays around the target object, but the target object is tracked for 2 seconds or more based on a movement path of the target object. Here, the target object surrounding means a point where a floating deviation angle (FGR) is 3° or less. In this case, the FGR is defined as an angle between a virtual line connected by assuming that a center of a floating target object is viewed by the user and a virtual line when the user actually views the target object surrounding.

That is, the target object is positioned in various angle directions based on the target object, but when the eye moves for 2 seconds or more along a movement path of the target object while the eye stays at the point where the FGR is 3° or less, the eye stays for at least 2 seconds or more.

Further, the case where the eye of the user stays at the target object for at least 2 seconds may include a case where the eye stays in the target object surrounding, but a tracking deviation angle (TGR) for the target object is 35° or more. Here, the TGR may be defined as an angle from a tracking start point where the eye starts to stay based on the eyes of the user up to a current location (a location at which the eye stays) at which the tracking is performed.

Further, the case where the input is determined for the input object 501 may further include a case where the target object is tracked for 1 second or more based on the movement path of the target object, and the eye is moved in advance up to a path in which a deviation angle is 45° or more on a motion expectation path of the target object.

When the user stares at an alphabet to be input among the plurality of target objects 500 floated to the smart lenses 111 and 112 for a predetermined time or more, the size of the input object 501 may increase to be much larger than the size of another target object as illustrated in FIG. 5a(b). Through such an operation, the user knows a fact that the target object 500 is selected as the input object 501. That is, the user (or a user who uses the eye tracking system) determines the input object 501.

In this case, since the above case may include a case where the user stares at the target object in an unconscious state for a predetermined time or more, an additional gesture may be required in order to perform the input for the input object 501 having the increased size.

For example, at least two motions eye blinks or an eye closing motion for a predetermined time or more may be required for the input object 501. However, here, at least two eye blinks mean that the eye is blinked two times or more with a reference time. Alternatively, a specific motion of a specific single muscle or muscle group may be required for the input object 501. Here, the specific single muscle or muscle group may mean a muscle around the eyeball, and may be ocular muscle, extraocular muscle, extrinsic eye muscle, superior rectus muscle, inferior rectus muscle, inner rectus muscle, outer rectus muscle, etc.

As a result, after the user inputs the alphabet 'E', the alphabet 'E' may be input into an input window 502 disposed on an upper end of the first area A1 as illustrated in FIG. 5b(c). In this case, when the user wrongly performs the input, the user may also delete a letter by using a delete button 503 disposed in the input window 502.

Subsequently, referring to FIGS. 5b(c) and 5b(d), the size of the input object 501 which the user views for a predetermined time or more may be increased and a color of the input object 501 may be changed. In this case, in respect to the color of the input object 501, only a letter color may also be changed and a letter surrounding color may also be changed like a shade of the letter. Further, an alphabet 'X' which is the input object may be input into the input window 502. As a result, there is an effect that the user may more easily identify the target object 500 at which the user stares.

Referring to FIG. 6, an eye range setting unit may determine an eye range (SR) of the user based on eye tracking data tracked from the eye tracking unit 102. For example, as illustrated in FIGS. 5a to 5b, it can be seen that the user primarily stares at a right area of the first lens 111, i.e., the second area A2 and the fourth area A4, and a left area of the second lens 112, i.e., the first area A1 and the third area A3. As a result, the SR of the user may be determined as the center of the eye of the user.

According to the present invention, as the eye range of the user is set, the target object is frequently exposed to the eye range familiar to the user, and as a result, convenience of a task may be increased so as for the user to easily select the target object.

Further, in an eye range area, the target object may be frequently floated or duplicatedly floated. Duplicatedly floating the target object means that at least two same characters are floated within one cycle of floating the plurality of target objects.

The target object is duplicatedly floated in the eye range area to increase staring accuracy of the user. In other words, since there may be a specific location at which the user conveniently stares at the target object even within the eye range area, accuracy of the input may be increased upon delicately floating at least two duplicated characters.

FIG. 7 is an exemplary diagram for describing an input process of an automatic completion object using an eye according to yet another embodiment of the present invention.

As illustrated in FIG. 7, when up to 'EXP' is input into the input window of the first lens 111, an automatic recommendation word started with 'EXP' by the recommendation word providing unit 105 may be floated to the smart lenses 111 and 112. Here, the automatic recommendation word may be defined as an automatic completion type word provided when at least two letters are given, and also defined as a user customized recommendation word provided based on basic information initially set by the user who wears the smart glasses 100.

Specifically, a plurality of target objects such as R, U, P, S, T, etc., may be floated to the first lens 111, and automatic recommendation words such as 'EXPLORE', 'EXPLORING', 'EXPLAIN', and 'EXPECT' may be floated to the second lens 112. It is illustrated in FIG. 7 that the automatic recommendation word is floated to the second lens 112, but the automatic recommendation word may be floated to the first lens 111 or both the smart lenses 111 and 112.

Referring to FIG. 7, it can be seen that 'EXPLORE' is input as an input object 701. In this case, it is illustrated that only one word is input into an input window A11, but a plurality of options may also be input. Meanwhile, when the input object is determined in the step of floating the automatic recommendation word, the determined input object may be excluded from the target object floated in a next step.

Further, the floated automatic recommendation word may be floated at different speeds according to an interest level of the user. For example, a word having a high interest level of the user may be floated slowly and a word having a low interest level may be floated quickly. Here, the interest level may be set based on basic information (e.g., an interested item of the user, a business field of the user, etc.) initially set by the user, and also set based on an input frequency of the user.

Accordingly, according to the present invention, since a process of inputting the target objects one by one may be omitted by providing the automatic recommendation word to the user, there is an effect that a business speed may be effectively decreased.

FIG. 8 is an exemplary diagram illustrating an automatic completion list according to yet another embodiment of the present invention.

Referring to FIG. 8, when up to 'EXP' is input into the input window of the first lens 111, an automatic recommendation word started with 'EXP' by the recommendation word providing unit 105 may pop up to the smart lenses 111 and 112 in a list form.

As illustrated in FIG. 8, the input unit 104 may input 'EXPLORE' as an input object 801 in an automatic completion list 800 which pops up according to the eye of the user.

In this case, a lens in which the automatic completion list pops up is easily changeable by the user. Further, when there are many automatic recommendation words recommended in the automatic completion list, the automatic completion list may also pop up in both the smart lenses 111 and 112.

Accordingly, according to the present invention, the automatic recommendation words are provided to the user in the list form to prevent unnecessary eye movement of the user. As a result, there is an advantage in that efficient business conducting of the user is possible.

Although the embodiments of the present invention have been described in detail with reference to the accompanying drawings, the present invention is not limited thereto and may be embodied in many different forms without departing from the technical concept of the present invention. Therefore, the embodiments of the present invention are provided for illustrative purposes only but not intended to limit the technical concept of the present invention. The scope of the technical concept of the present invention is not limited to the embodiment. Therefore, it should be understood that the above-described embodiments are illustrative in all aspects and do not limit the present invention. The protective scope of the present invention should be construed based on the following claims, and all the technical concepts in the equivalent scope thereof should be construed as falling within the scope of the present invention.

The invention claimed is:

1. An eye tracking system comprising:
a pupil sensing unit sensing a pupil of a user by at least one sensor embedded in smart glasses;
a display unit including a smart lens to which a plurality of target objects are floated;
an eye tracking unit tracking an eye through at least one sensor and acquiring eye state information of the user for the plurality of target objects;
an input unit performing an input after selecting a specific object in which the eye of the user stays for a predetermined time or more among the plurality of target objects as an input object based on the eye state information; and
an eye range setting unit that sets an eye range of the user based on eye tracking data tracked from the eye tracking unit,
wherein at least one of a size, a color, and a movement direction of the input object is changed when the user views the input object for the predetermined time or more,
wherein the display unit floats and moves more target objects to an area of the eye range than an area other than the area of the eye range, and
wherein the target objects are floated and moved in different directions based on a center point of the smart lens, and the different directions include at least one of a diagonal direction, a clockwise direction, a counter-clockwise direction, and a whirl direction.

2. The eye tracking system of claim 1, wherein the smart lens is divided into four quadrants based on the center point, and at least one target object is floated to each area of the four quadrants.

3. The eye tracking system of claim 2, wherein the plurality of target objects floated to each area of the four quadrants is floated at once at one cycle or sequentially floated through various cycles.

4. The eye tracking system of claim 1, wherein an automatic recommendation word is floated and moved in a differential speed based on an interest level of the user, and
the interest level is determined by any one of an interested item preset by the user, a business field of the user, and an input frequency of the user for the target object, and
wherein a word having a high interest level of the user is floated and moved slowly and a word having a low interest level is floated and moved quickly.

5. An eye tracking method comprising:
sensing, by a pupil sensing unit, a pupil of a user;
tracking, by an eye tracking unit, an eye of the user for a plurality of target objects floated to a display unit including a smart lens;
acquiring eye state information of the user for the plurality of target objects;
setting, by an eye range setting unit, an eye range of the user based on eye tracking data tracked from the eye tracking unit; and
determining, by an input unit, a specific object in which the eye of the user stays for a predetermined time or more among the plurality of target objects by the user as an input object, and processing the specific object as an input,
wherein at least one of a size, a color, and a movement direction of the input object is changed based on the eye state information of the user,
wherein more target objects are floated and moved to an area of the eye range than an area other than the area of the eye range eye range area, and
wherein the target objects are floated and moved in different directions based on a center point of the smart lens, and the different directions include at least one of a diagonal direction, a clockwise direction, a counter-clockwise direction, and a whirl direction.

6. A computer readable recording medium storing computer-executable instructions to execute an eye tracking process, the eye tracking process comprising:
sensing, by a pupil sensing unit, a pupil of a user;
tracking, by an eye tracking unit, an eye of the user for a plurality of target objects floated to a display unit;
acquiring eye state information of the user for the plurality of target objects;
setting, by an eye range setting unit, an eye range of the user based on eye tracking data tracked from the eye tracking unit; and
determining, by an input unit, a specific object in which the eye of the user stays for a predetermined time or more among the plurality of target objects by the user as an input object, and processing the specific object as an input,
wherein at least one of a size, a color, and a movement direction of the input object is changed based on the eye state information of the user, and
wherein more target objects are floated and moved to an area of the eye range than an area other than the area of the eye range,
wherein at least one of a size, a color, and a movement direction of the input object is changed when the user views the input object for the predetermined time or more, and
wherein the target objects are floated and moved in different directions based on a center point of the smart lens, and the different directions include at least one of a diagonal direction, a clockwise direction, a counterclockwise direction, and a whirl direction.

\* \* \* \* \*